(12) United States Patent
Yetukuri et al.

(10) Patent No.: US 8,781,689 B2
(45) Date of Patent: Jul. 15, 2014

(54) SYSTEM FOR CONTROLLING A VEHICLE HEAD RESTRAINT

(75) Inventors: Arjun Yetukuri, Rochester Hills, MI (US); David A. Hein, Sterling Heights, MI (US); Gerald S. Locke, Lake Orion, MI (US)

(73) Assignee: Lear Corporation, Southfield, MI (US)

( * ) Notice: Subject to any disclaimer, the term of this patent is extended or adjusted under 35 U.S.C. 154(b) by 55 days.

(21) Appl. No.: 13/049,230

(22) Filed: Mar. 16, 2011

(65) Prior Publication Data

US 2012/0235452 A1    Sep. 20, 2012

(51) Int. Cl.
*B60R 22/00* (2006.01)
*G06F 7/00* (2006.01)
*H02K 17/32* (2006.01)
*A47C 1/10* (2006.01)

(52) U.S. Cl.
USPC ............... 701/49; 701/36; 318/434; 318/567; 297/391

(58) Field of Classification Search
USPC ................................................ 701/49, 36, 45
See application file for complete search history.

(56) References Cited

U.S. PATENT DOCUMENTS

| | | | |
|---|---|---|---|
| 4,674,797 A | | 6/1987 | Tateyama |
| 4,935,680 A * | | 6/1990 | Sugiyama ..................... 318/567 |
| 5,105,132 A * | | 4/1992 | Sakamoto et al. ............ 318/434 |
| 5,669,668 A | | 9/1997 | Leuchtmann |
| 5,952,630 A | | 9/1999 | Filion et al. |
| 6,483,048 B1 | | 11/2002 | Bontrager et al. |
| 6,657,140 B2 | | 12/2003 | Rantet |
| 6,765,158 B1 | | 7/2004 | Morrison et al. |
| 6,983,995 B1 | | 1/2006 | Veine et al. |
| 7,267,407 B1 | | 9/2007 | Demick et al. |
| 7,369,928 B2 * | | 5/2008 | Wang et al. ..................... 701/49 |
| 7,455,363 B2 | | 11/2008 | Chung |
| 7,631,932 B2 | | 12/2009 | Hoffmann |
| 7,656,299 B2 * | | 2/2010 | Gentry et al. .............. 340/573.1 |
| 7,860,626 B2 * | | 12/2010 | Breed ............................. 701/49 |

(Continued)

FOREIGN PATENT DOCUMENTS

| | | |
|---|---|---|
| DE | 10250416 A1 | 8/2003 |
| DE | 102008064348 B3 | 4/2010 |
| EP | 0352234 B1 | 4/1993 |

OTHER PUBLICATIONS

German Office Action for corresponding Application No. 10 2012 203 877.9, mailed Apr. 10, 2013, 4 pages.

(Continued)

*Primary Examiner* — Thomas Black
*Assistant Examiner* — Tyler Paige
(74) *Attorney, Agent, or Firm* — Brooks Kushman P.C.

(57) ABSTRACT

A vehicle seat assembly is provided with a support structure and a head restraint supported by the support structure and being movable relative to the support structure between a first position and a second position. An actuator is connected to the head restraint for moving the head restraint, and a controller is in communication with the actuator. A sensor array is supported by one of the support structure and the head restraint and in communication with the controller. The sensor array has a first region and a second region. The sensor array is configured to sense an input of the first region and second region being sequentially activated. The sensor array communicates the input to the controller, and the controller causing the actuator to move the head restraint.

20 Claims, 3 Drawing Sheets

(56) References Cited

U.S. PATENT DOCUMENTS

| | | |
|---|---|---|
| 2007/0235297 A1 | 10/2007 | Stoschek et al. |
| 2007/0257528 A1* | 11/2007 | Akaike et al. ............ 297/216.12 |
| 2009/0058162 A1 | 3/2009 | Boes et al. |
| 2009/0146479 A1 | 6/2009 | Boes et al. |
| 2009/0243354 A1* | 10/2009 | Farquhar et al. ......... 297/216.12 |
| 2009/0243364 A1 | 10/2009 | Brunner et al. |
| 2010/0045090 A1 | 2/2010 | Brunner et al. |
| 2010/0148559 A1 | 6/2010 | Prokop et al. |
| 2011/0316318 A1* | 12/2011 | Yamaguchi et al. .......... 297/410 |

OTHER PUBLICATIONS

Chinese Office Action for corresponding Application No. 201210054778.1, mailed Dec. 30, 2013, 9 pages.

* cited by examiner

SYSTEM FOR CONTROLLING A VEHICLE HEAD RESTRAINT

TECHNICAL FIELD

Various embodiments relate to systems for controlling a vehicle head restraint.

BACKGROUND

A vehicle seat assembly may be provided with a movable head restraint. Examples of movable head restraints are disclosed in U.S. Pat. Nos. 4,674,797, 5,699,668, 6,983,995, and 7,267,407.

SUMMARY

A head restraint is provided for use with a vehicle seat assembly. The head restraint is supported by a support structure and is movable between a first position and a second position. An actuator is connected to the head restraint to move the head restraint. A controller is in communication with the actuator for controlling the actuator. A sensor array is supported by one of the support structure and the head restraint and in communication with the controller. The sensor array is configured to receive an input of a first region and a second region being sequentially activated, where the sensor communicates the input to the controller, and the controller causes the actuator to move the head restraint.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
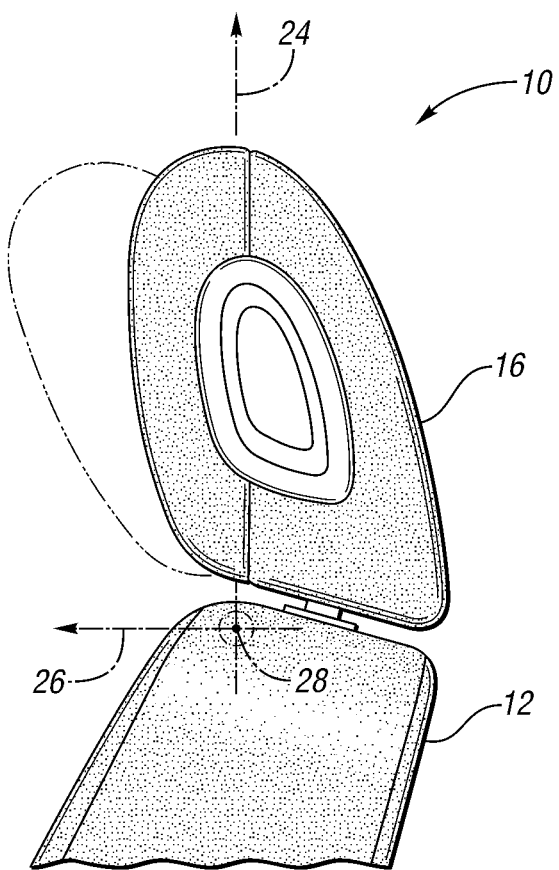
FIG. 1 is a schematic of a vehicle seat assembly and head restraint.

FIG. 1 illustrates a vehicle seat assembly 10. The vehicle seat assembly 10 may be a front seat, such as a driver seat assembly or a front passenger seat assembly, or may be a rear seat assembly, such as a second row or a third row seating of a vehicle. The seat assembly 10 has a support structure 12, such as a seatback. The support structure 12 supports a head restraint 16. The head restraint 16 has adjustment features, which allow the head restraint 16 to move in various directions to provide ergonomic support for a cross section of different users, for example, by adjusting the height, backset and tilt, and to be able to fold and stow the head restraint when not in use, to improve driver visibility or seat stowage, or the like. The head restraint 16 is shown in the design position, and in a tilted forward or folded/stowed position shown in phantom.

Figure 2:
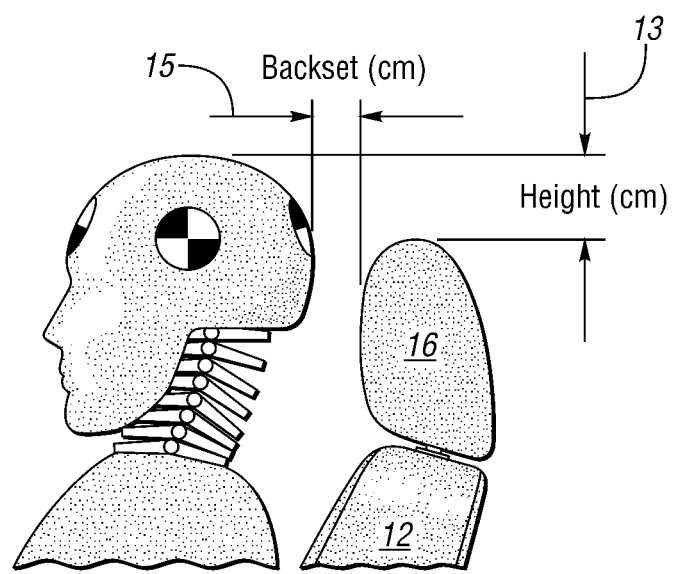
FIG. 2 is another schematic of a vehicle seat assembly and head restraint.

FIG. 2 illustrates two degrees of adjustment and freedom for the head restraint 16. A height 13 of the head restraint may be adjusted as well as an amount of backset 15 of the head restraint 16.

Figure 3:
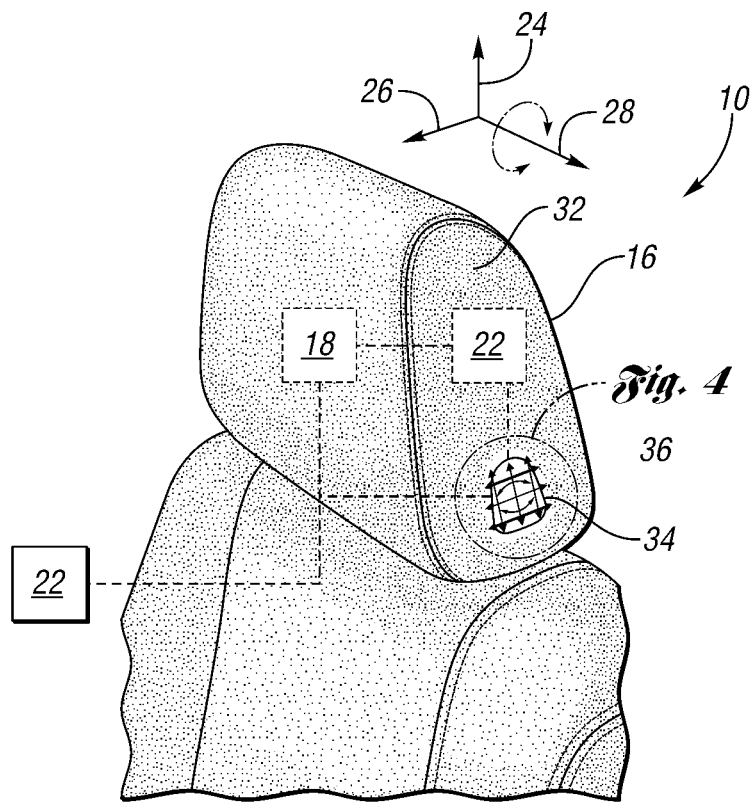
FIG. 3 is a schematic of a vehicle seat assembly according to an embodiment of the disclosure.

The head restraint 16, as shown in FIG. 3, contains power mechanisms as are known in the art to translate or rotate the head restraint 16. For example, an actuator 18, such as an electric motor, solenoid, or the like, is connected to various rack and pinions systems, lever systems, gears, cams, cranks, linkages, etc. to provide the motion of the head restraint 16. The actuator 18 is connected to a power source 20, such as a vehicle battery or an alternator. The actuator 18 is also connected to a controller 22, such as a microcontroller or integrated circuit, or the like, which controls the actuator 18. The controller 22 may turn the actuator on and off, control the direction of motion provided by the actuator 18, and control the duration of time that the actuator 18 is operated, which may correspond to the amount of movement of the head restraint 16.

For example, the head restraint 16 is configured to move in several directions, such as along a first axis 24, along a second axis 26, and in rotation about a third axis 28. Of course, translation or rotation about any axis is contemplated, and the head restraint may move or translate about any number of axes, including a single axis or more than three axes. The first axis 24 is shown as being in an upright orientation, or aligned with the longitudinal axis of the vehicle seat assembly 10 or seatback 12. The head restraint 16 travels along this axis 24 to change the height 13 of the head restraint 16 with respect to the vehicle seat assembly 10 or to the head of an occupant of the seat 10. The second axis 26 is shown as being in line with the fore/aft direction of the head restraint 16 or the vehicle seat assembly 10, which generally corresponds with the fore/aft direction of a vehicle that the seat assembly 10 is installed in. The head restraint 16 travels along this axis 26 to adjust the amount of backset 15 of the head restraint 16 with respect to the vehicle seat assembly 10. The third axis 28 is shown as being in a lateral or transverse direction of the head restraint 16 or the vehicle seat assembly 10. The head restraint 16 rotates or pivots about this axis 28 to fold or tilt the head restraint with respect to the vehicle seat assembly 10. The head restraint 16 has an angular motion about the axis 28 to rotate between a design position and tilted or folded position as shown in FIG. 1. The head restraint 16 may be placed in the folded position when the vehicle seat assembly 10 is unoccupied. If the vehicle seat 10 is occupied or is going to be occupied, the amount of tilt of the head restraint 16 may be adjusted by rotating the head restraint 16 about axis 28 to better fit the head position of an occupant, for example, by tilting the head restraint 16 forward or rearwards within a range of thirty degrees, sixty degrees, or some other amount.

A sensor array 34 is supported by the head restraint 16 as shown, or alternatively, may be located elsewhere on the vehicle seat assembly 10, such as on the seatback 12, a vehicle door, an armrest, a console, or the like. The sensor array 34 is electrically connected to the controller 22 and is powered by the power source 20. The sensor array 34 contains a plurality of capacitive sensors 36, which may be arranged, for example, into columns and rows. Alternatively, the sensor array 34 contains a plurality of any other positional sensors as are known in the art.

Each capacitive sensor 36 operates through capacitive touch sensing, using for example, the concept of a variable capacitor. In some embodiments, a printed circuit board (PCB) based capacitor is formed and an electric field is allowed to leak into the area above the capacitor, which includes the outer surface of the sensor array 34. A user interacts with this outer layer. The sensor pad and a surrounding ground pour (or ground plane underneath) create a baseline capacitance that can be measured.

When a conductor, e.g., a finger of a user, is near to or touches the outer surface of the sensor array 34 above an open capacitor 36, the electric field is interfered with and causes the resulting capacitance to change. The sensitivity of the sensor 36 may be adjusted through the connected detector integrated circuit or controller 22 such that the outer surface of the sensor array 34 needs to be touched to activate the sensor 36. The outer surface may act as an insulating layer and to provide separation between the sensor 36 and the user. The coupling of the conductive finger with the capacitive sensor 36 increases the capacitance of the structure beyond the baseline capacitance, or the capacitance of the sensor 36 with no touch.

In some embodiments, a ground plane underneath the sensor 36 aids in shielding it from potential interference generated by other electronics and helps to maintain a more constant baseline capacitance.

Figure 4:
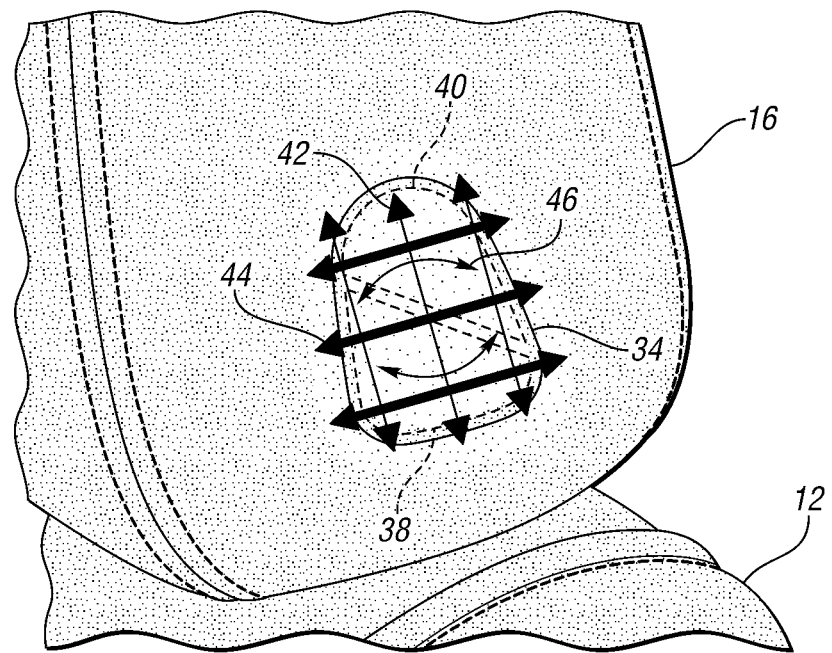
FIG. 4 is a schematic of the sensor array of FIG. 1 showing various inputs to the array according to various embodiments of the disclosure.

Referring to FIGS. 3 and 4, the head restraint 16 may be movable relative to the support structure 12 along one of the axes 24, 26, 28 between a first position and a second position. The first position and second position may be the locations of the head restraint 16 at its maximum travel along that respective axis, i.e. maximum and minimum heights, maximum and minimum backset, and design and tilted or folded positions. The actuator 18 moves the head restraint 16 along or about one or more of the axes 24, 26, 28. The sensor array 34 has a first region 38 and a second region 40. The regions 38, 40 are illustrated in FIG. 4, although any size or oriented region is contemplated. The regions 38, 40 are such that the user activates at least two sensors 36 in the array 34. The user typically slides a finger along the array 34, and activates sensors 36. If the user activates two sensors 36, the first sensor 36 activated would be in the first region 38, and the second sensor 36 activated would be in the second region 40. The path of sensors 36 activated defines the motion of the head restraint 16. The first region 38 and second region 40 may be adjacent to one another or spaced apart from one another on the sensor array 34. Each region 38, 40 contains one or more capacitive sensors 36 or other positional sensors. For example, a user interacts with the first region 38 by activating the capacitive sensors within it, and then slides their finger or otherwise activates sensors in the second region 40 immediately after interacting with the first region 38. A time limit may be programmed into the controller 22 such that the signal from sensors 36 in the second region 40 need to be received within a predetermined time after the signal from sensor 36 in the first region 38 to be considered an input. The controller 22 receives and processes the signals from the sensor array 34 and commands the actuator to move the head restraint based on the input.

For example, if the first position and second position of the head restraint are spaced apart along a longitudinal or upright axis of the vehicle seat assembly, the first and second regions of the sensor array are similarly oriented on the sensor array 34. When the user activates the first region 38 followed by the second region 40 (bottom to top motion 42 on FIG. 4), the head restraint 16 moves or translates away from the support structure 12 along the longitudinal axis 24. Based on the magnitude of the sliding motion, i.e. number of sensors 36 activated, and/or length of sensor array 34 activated, etc., the head restraint 16 may translate anywhere from an incremental amount between the first and second positions, to the complete distance between the first and second positions. Similarly, the head restraint 16 may be moved or translated from the second position to the first position by activating the second region 40 followed by the first region 38 of the sensor array 34 (top to bottom motion 42 on FIG. 4).

If the first position and second position of the head restraint 16 are spaced apart along a fore/aft axis 26 of the vehicle seat assembly 10, the first and second region of the sensor array 38, 40 are similarly oriented on the sensor array 34. When the user activates the first region 38 followed by the second region 40 (left to right motion 44 on FIG. 4), the head restraint 16 moves or translates rearward along the fore/aft axis 26. Based on the magnitude of the sliding motion, i.e. number of sensors 36 activated, and/or length of sensor array 34 activated, etc., the head restraint 16 may translate anywhere from an incremental amount between the first and second positions, to the complete distance between the first and second positions. Similarly, the head restraint 16 may be moved or translated from the second position to the first position by activating the second region 40 followed by the first region 38 of the sensor array 34 (right to left motion 44 on FIG. 4).

If the first position and second position are spaced apart about a lateral axis 28 of the vehicle seat assembly 10, such that they are at different angular positions about the axis 28, the first and second region of the sensor array 38, 40 are similarly oriented on the sensor array 34. When the user activates the first region 38 followed by the second region 40 (clockwise motion 46 on FIG. 4), the head restraint 16 moves towards a design position about the lateral axis 28. The head restraint 16 will move along an arcuate path as it is tilted by rotating about the lateral axis 28. Varying degrees of forward and backward tilt of the head restraint 16 are contemplated, including but not limited to thirty degrees, sixty degrees, to a forward folded position, or any other amount. If the head restraint 16 is capable of tilting forward or backwards through thirty degrees, the head restraint may be positioned at any position as limited by that thirty degree value, i.e. forward ten degrees, backward fifteen degrees, forward twenty degrees, etc. Based on the magnitude of the sliding motion, i.e. number of sensors 36 activated, length of sensor array 34 activated, etc., the head restraint 16 may move anywhere from an incremental amount between the first and second positions, to the complete distance between these positions. Similarly, the head restraint 16 may be moved from the second position to the first position by activating the second region 40 followed by the first region 38 of the sensor array 34 (counter clockwise motion 46 on FIG. 4).

The head restraint 16 may include a substrate (not shown) that is covered with a foam cushion or other padding material, which in turn may be covered with trim 32 such as a fabric, leather, or other similar material. In some embodiments, the sensor array 34 is connected to the substrate, and the trim cover 32 is placed over the sensor array 34 to cover it. The trim cover 32 may have demarcation such as stitching, different material, or the like, to show the location of the sensor array 34 to a user. In other embodiments, the sensor array 34 is integrated into the trim cover 32, and the trim cover 32 containing the sensor array 34 is affixed to the substrate of the head restraint 16. The sensor array 34 may be made from a flexible material to have properties similar to that of the trim cover 32.

For a head restraint 16 with a conventional adjustment system, such as a mechanical button or lever, the system is limited by design constraints, i.e. only one location for the button or lever and over a relatively small surface area of the head restraint 16 even if there is more than one location may be desired for the user interface. With embodiments of the present disclosure, the sensor array 34 may cover more than one of these preferred locations for user access to adjust the head restraint 16 because the array 34 is not as limited in size as the mechanical mechanisms, or more than one array 34 may be used at more than one location, i.e. an array 34 on the head restraint 16 and an array 34 on the support structure 12 or seatback is possible with the use of the controller 22.

In some embodiments, shown in FIGS. 3-4, the vehicle seat assembly 10 has a head restraint 16 supported by the support structure 12 where the head restraint 16 is movable relative to the support structure for translation along a first axis 24, translation along a second axis 26, and rotation about a third axis 28. Therefore the head restraint 16 has six degrees of freedom, although any number of degrees of freedom is contemplated, such as less than or more than six.

An actuator 18 is connected to the head restraint 16 to move the head restraint 16. The actuator 18 may contain more than one motor and/or more than one mechanical system to provide required motion of the head restraint 16. For example, three motors may be provided, with one for each of the translation movements, and one for the rotational movement of the head restraint 16. Also, a separate rack and pinion, lever, gear, or other mechanical mechanism may be provided for each movement.

A sensor array 34 may contain a plurality of capacitive sensors 36 or other positional sensors and is electrically connected to the controller 22. The capacitive sensors 36 are activated by the user, and the pattern or path of the activated sensors during an input determines the corresponding movement of the head restraint 16. Sample paths or patterns which correspond with movement of the head restraint 16 for translation along a first axis 24, translation along a second axis 26, and rotation about a third axis 28 are shown in FIG. 4. An input to the sensor array 36 includes the activation of at least two adjacent sensors 36, and to be considered an input by the controller 22, the adjacent sensors may need to be activated within a predetermined time limit, such that there is a maximum time delay between sensor 36 activations. When at least two adjacent sensors 36 are activated in a direction on the sensor array 34 which corresponds with one of the axes 24, 26, 28, the controller 22 commands the actuator 18 to move the head restraint 16 along that axis. As the number of adjacent sensors 36 activated for an input increases, the head restraint 16 may travel along a correspondingly longer distance along that axis.

Alternately, at the first position or the second position of the head restraint 16, at least one input from a user is required, such as the use of two fingers to activate the head restraint 16 to translate or rotate about an axis. This would activate at least two sensors 36 of the sensor array 34 in either the first or second region 38, 40, and may prevent an inadvertent activation of the head restrain 16.

Alternatively, after sensors 36 are activated in either the first or second region 38, 40 and indicate the direction of motion of the head restraint 16, if the finger remains in the same region 38, 40 and does not cross into the other region 40, 38, the motion of the head restraint 16 continues in that direction until the input from a user to the sensor array 34 ends.

The first, second, and third axes 24, 26, 28 may be nonparallel to one another, such that they converge at a point or origin. In some embodiments, the first, second, and third axes 24, 26, 28 are orthogonal to one another.

Figure 5:
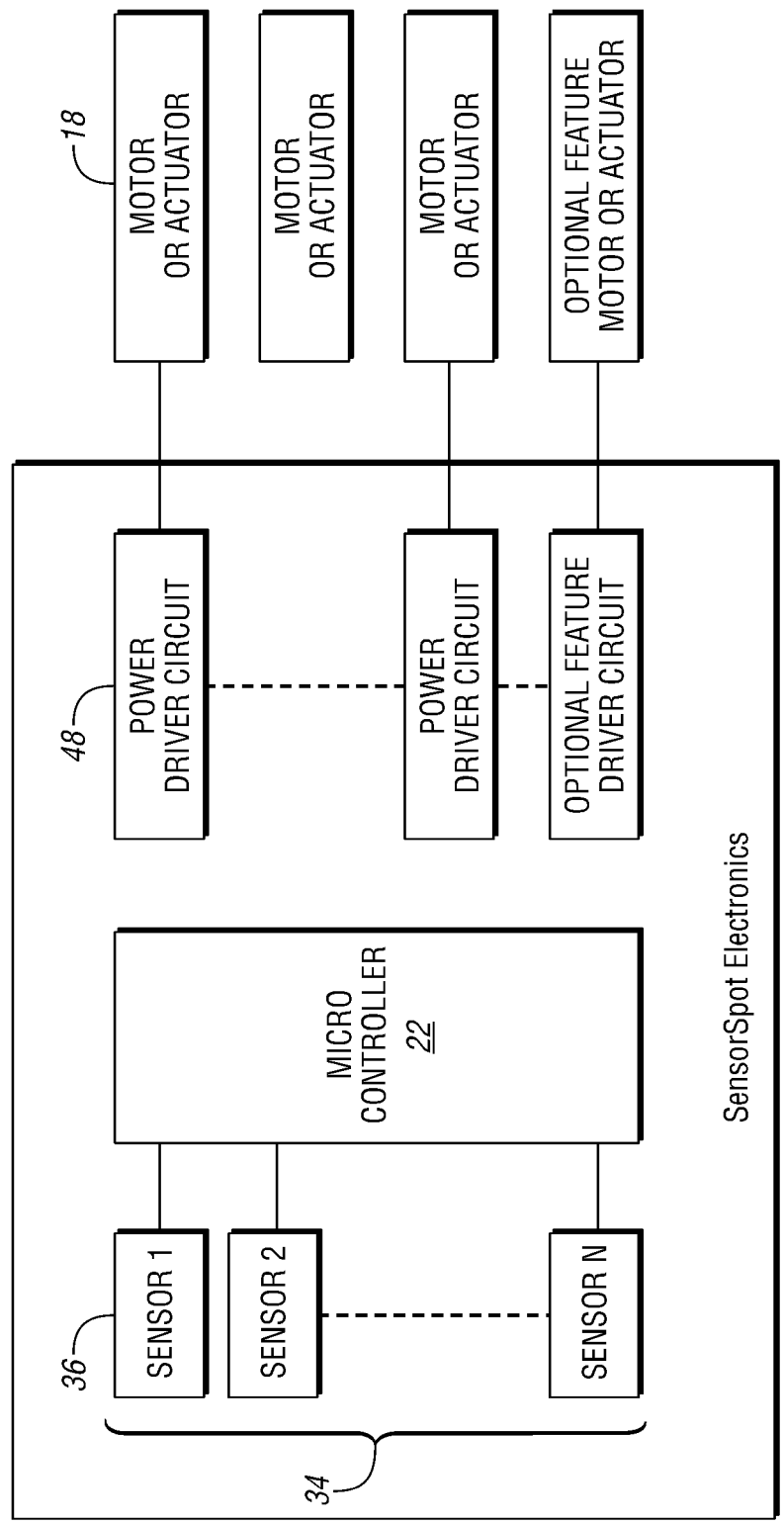
FIG. 5 is a schematic of an electronics diagram for use with the vehicle seat assembly of FIG. 3.

FIG. 5 illustrates an electrical component schematic for use with the head restraint 16. Capacitive sensors 36 in the array 34 are connected to the controller 22. A ground may also be connected to the controller 22. The controller 22 may be an integrated circuit or other microcontroller. The controller 22 is connected to the various motors or actuators 18 for the head restraint 16 using power driver circuits 48. Each actuator 18 controls one of the movements of the head restraint 16, i.e. translation along axis 24, translation along axis 26, or rotation along axis 28. Alternatively, the controller 22 may command two or more actuators 18 to act in concert to provide one of the movements, such as rotation of the head restraint 16. Optional features may be available through additional driver circuits and actuators such as movable comfort wings, head restraint monitors, anti-whiplash protection, and the like.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat assembly comprising:
   a support structure;
   a head restraint supported by the support structure and being movable relative to the support structure between a first position and a second position;
   an actuator connected to the head restraint for moving the head restraint;
   a controller in communication with the actuator for controlling the actuator; and
   a planar sensor array in communication with the controller and accessible from an outer surface of the vehicle seat assembly, the sensor array having a first region and a second region adjoining the first region, wherein the sensor array is configured to sense a tactile input of the first region and second region being sequentially activated by a user, the sensor array communicating the tactile input to the controller, and the controller causing the actuator to move the head restraint in response to the tactile input by the user.

2. The vehicle seat assembly of claim 1 wherein the sensor array further comprises a capacitive sensor in the first region and a capacitive sensor in the second region.

3. The vehicle seat assembly of claim 1 wherein the first position and second position of the head restraint are spaced apart along a longitudinal axis of the vehicle seat assembly.

4. The vehicle seat assembly of claim 1 wherein the first position and second position of the head restraint are spaced apart along a fore/aft axis of the vehicle seat assembly.

5. The vehicle seat assembly of claim 1 wherein the first position and second position are rotationally spaced apart about a lateral axis of the vehicle seat assembly such that the head restraint pivots about the lateral axis when moving between the first position and second position.

6. The vehicle seat assembly of claim 1 further comprising a trim cover supported by the head restraint, the trim cover covering the sensor array.

7. The vehicle seat assembly of claim 6 wherein the trim cover includes indicia to show a location of the sensor array.

8. The vehicle seat assembly of claim 1 further comprising a trim cover supported by the head restraint, wherein the sensor array is integrated into the trim cover.

9. The vehicle seat assembly of claim 1 wherein the input from the sensor array causes the actuator to move the head restraint at least a portion of the way between the first and second position.

10. A vehicle seat assembly comprising:
a support structure;
a head restraint supported by the support structure and being movable relative to the support structure for translation along a first axis, translation along a second axis, and rotation about a third axis;
an actuator connected to the head restraint for moving the head restraint;
a generally planar sensor array supported by the vehicle seat assembly and with a plurality of capacitive sensors arranged in at least one column and at least two rows; and
a controller in communication with the actuator and in communication with the sensor array, wherein the controller is configured to sense a user finger touch input from the sensor array and control the actuator to move the head restraint such that the movement of the head restraint corresponds with the input received by the sensor array.

11. The vehicle seat assembly of claim 10 wherein the input activates at least two adjacent sensors.

12. The vehicle seat assembly of claim 11 wherein the adjacent sensors are activated within a predetermined time limit.

13. The vehicle seat assembly of claim 10 wherein the first, second, and third axes are nonparallel to one another.

14. The vehicle seat assembly of claim 10 wherein the first, second, and third axes are perpendicular to one another.

15. A head restraint for a vehicle seat assembly comprising:
a head restraint body adapted to be supported by a vehicle seatback, the head restraint body movable along an axis between a first position and a second position;
an actuator connected to the head restraint body, the actuator being configured to move the head restraint body along the axis;
a sensor array having a plurality of sensors supported by the head restraint body, the plurality of sensors arranged in at least one column and at least two rows and positioned along an outer surface of the sensor array; and
a controller in communication with the actuator and in communication with the sensor array, wherein the controller is configured to receive a user touch input from the sensor array when a path of at least two adjacent sensors are activated by the user on the sensor array which corresponds with the axis, the controller configured to control the actuator to move the head restraint along the axis to correspond with the user touch input.

16. The head restraint of claim 15 wherein as the number of adjacent sensors activated in the input increases such that a length of the path increases, the head restraint travels a longer distance along the axis.

17. The head restraint of claim 15 wherein as a time of activation of one of the plurality of sensors increases, the head restraint travels a longer distance along the axis.

18. The vehicle seat assembly of claim 1 wherein the first region and the second region of the sensor array are directly adjacent to one another.

19. The vehicle seat assembly of claim 10 wherein the controller is further configured to sense the user touch input from the sensor array as a path of activated sensors in the sensor array; and
wherein the controller is further configured to control the actuator to move the head restraint along at least one of the first, second and third axes such that the movement of the head restraint follows the path of activated sensors.

20. The vehicle seat assembly of claim 1 wherein the head restraint body has a front surface adapted to receive the head of a user and a side surface extending at an angle away from the front surface;
wherein the sensor array is positioned on the side surface of the head restraint body.

* * * * *